United States Patent
Umezu

(10) Patent No.: US 8,335,940 B2
(45) Date of Patent: Dec. 18, 2012

(54) MICROCOMPUTER SYSTEM, MICROCOMPUTER, POWER CONTROL METHOD, AND POWER CONTROL PROGRAM PRODUCT

(75) Inventor: Tomoaki Umezu, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 394 days.

(21) Appl. No.: 12/662,935

(22) Filed: May 12, 2010

(65) Prior Publication Data

US 2010/0313053 A1   Dec. 9, 2010

(30) Foreign Application Priority Data

Jun. 9, 2009  (JP) ................................. 2009-138057

(51) Int. Cl.
*G06F 1/28*  (2006.01)

(52) U.S. Cl. .............................. 713/340; 714/14; 714/22

(58) Field of Classification Search .................. 713/340; 714/14, 22
See application file for complete search history.

(56) References Cited

U.S. PATENT DOCUMENTS

| 5,576,941 | A  | * | 11/1996 | Nguyen et al. | ............. 363/21.07 |
| 6,636,016 | B2 | * | 10/2003 | Tanaka et al. | ................. 320/107 |
| 7,840,840 | B2 | * | 11/2010 | Takahashi et al. | ............. 714/14 |

FOREIGN PATENT DOCUMENTS

JP   7-271754 A   10/1995

* cited by examiner

*Primary Examiner* — Thuan Du
(74) *Attorney, Agent, or Firm* — McGinn IP Law Group, PLLC

(57) ABSTRACT

A microcomputer system according to the present invention includes multiple backup power supplies that are used instead of the main power supply in response to a voltage drop of a main power supply. The microcomputer system further includes a backup power supply monitoring circuit that monitors charge amount of the multiple backup power supplies and determines whether the charge amount is lower than a predetermined charge amount, a backup power supply charging circuit that charges the backup power supply from the main power supply, where the backup power supply is determined by the backup power supply monitoring unit that the charge amount thereof is lower than the predetermined charge amount, and a power supply switching unit that switches to the backup power supply selected according to a predetermined rule if a voltage of the main power supply is reduced.

10 Claims, 8 Drawing Sheets

MICROCOMPUTER SYSTEM, MICROCOMPUTER, POWER CONTROL METHOD, AND POWER CONTROL PROGRAM PRODUCT

INCORPORATION BY REFERENCE

This application is based upon and claims the benefit of priority from Japanese patent application No. 2009-138057, filed on Jun. 9, 2009, the disclosure of which is incorporated herein in its entirety by reference.

BACKGROUND

1. Field of the Invention

The present invention relates to a microcomputer system, a microcomputer, a power supply control method, and a power supply control program product, and particularly to a microcomputer system including a backup power supply, a microcomputer used by the microcomputer system, a power supply control method for the microcomputer, and a power supply control program product used for the microcomputer.

2. Description of Related Art

In recent years, the consciousness of the low power consumption of computer systems is increasing globally. Therefore, lower power consumption of individual computer apparatuses increases the need to tackle to reduce the power consumption of the entire operating system including the computer apparatuses. Further, it is desired to realize lower power consumption of the computer system, and at the same time, to keep the power supply in case of power failure.

Japanese Unexamined Patent Application Publication No. 7-271754 discloses a system to switch the power supply of a microcomputer without evacuating data in a memory to an external memory or the like at the time of blackout, for the purpose of holding data in the state of low power consumption. Specifically, the microcomputer includes a power supply voltage detection circuit to detect a voltage drop of the main power supply. If the power supply voltage detection circuit detects a voltage drop of the main power supply, the microcomputer switches the power supply from main power supply to backup power supply. Further, the microcomputer switches the whole microcomputer to the standby mode with low power consumption. Accordingly, the microcomputer has realized to hold data with low power consumption even if the main power supply is in an abnormal condition.

SUMMARY

In Japanese Unexamined Patent Application Publication No. 7-271754, in response to a detection of a voltage drop of the main power supply, the microcomputer switches to the backup power supply. However, at this time, the voltage level of the backup power supply may be lower than the voltage level of the main power supply. In such a case, the present inventor has found a problem that the microcomputer does not operate normally by the switch of the power supply.

A first exemplary aspect of the present invention is a microcomputer system that includes a plurality of backup power supplies that are used instead of a main power supply in response to a voltage drop of the main power supply, a backup power supply monitoring unit that monitors charge amount of the plurality of backup power supplies and determines whether the charge amount is lower than a predetermined charge amount, a backup power supply charging unit that charges the backup power supply from the main power supply, where the backup power supply is determined by the backup power supply monitoring unit that the charge amount thereof is lower than the predetermined charge amount, and a power supply switching unit that switches to the backup power supply selected according to a predetermined rule if a voltage of the main power supply is reduced.

A second exemplary aspect of the present invention is a microcomputer that includes a backup power supply monitoring unit that monitors charge amount of a plurality of backup power supplies and also determines whether the charge amount is lower than a predetermined charge amount, the plurality of backup power supplies being used instead of a main power supply in response to a voltage drop of the main power supply, a backup power supply charge control unit that charges the backup power supply from the main power supply, where the backup power supply is determined by the backup power supply monitoring unit that the charge amount thereof is lower than the predetermined charge amount, and a power supply switching unit that switches to the backup power supply, where the backup power supply is selected previously according to a predetermined rule if a voltage of the main power supply is reduced A third exemplary aspect of the present invention is a method of power supply control that includes monitoring a charge amount of a plurality of backup power supplies, the plurality of backup power supplies being switched in response to a voltage drop of a main power supply and used instead of the main power supply; determining whether the charge amount is lower than a predetermined charge amount; charging the backup power supply from the main power supply, the backup power supply being determined that the charge amount thereof is lower than the predetermined charge amount; and switching to the backup power supply selected according to a predetermined rule if a voltage of the main power supply reduces.

A fourth exemplary aspect of the present invention is a non-transitory computer readable medium that stores a power supply control program for causing a control computer of a microcomputer to execute includes monitoring charge amount of a plurality of backup power supplies, the plurality of backup power supplies being used instead of the main power supply in response to a voltage drop of a main power supply, determining whether the charge amount is lower than a predetermined charge amount, directing to charge the backup power supply from the main power supply, the charge amount of the backup power supply being lower than the predetermined charge amount; and switching to the backup power supply selected according to a predetermined rule if a voltage of the main power supply reduces.

By monitoring the charge amount of the multiple connected backup power supplies and charging the backup power supplies which are running out of the charge amount, it is possible to select a backup power supply which can operate the microcomputer normally at the time of power supply switch.

The present invention enables to provide a microcomputer system, a microcomputer, a power supply control method, and a power supply control program product that can switch to an appropriate backup power supply.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

[First Exemplary Embodiment]

Figure 1:
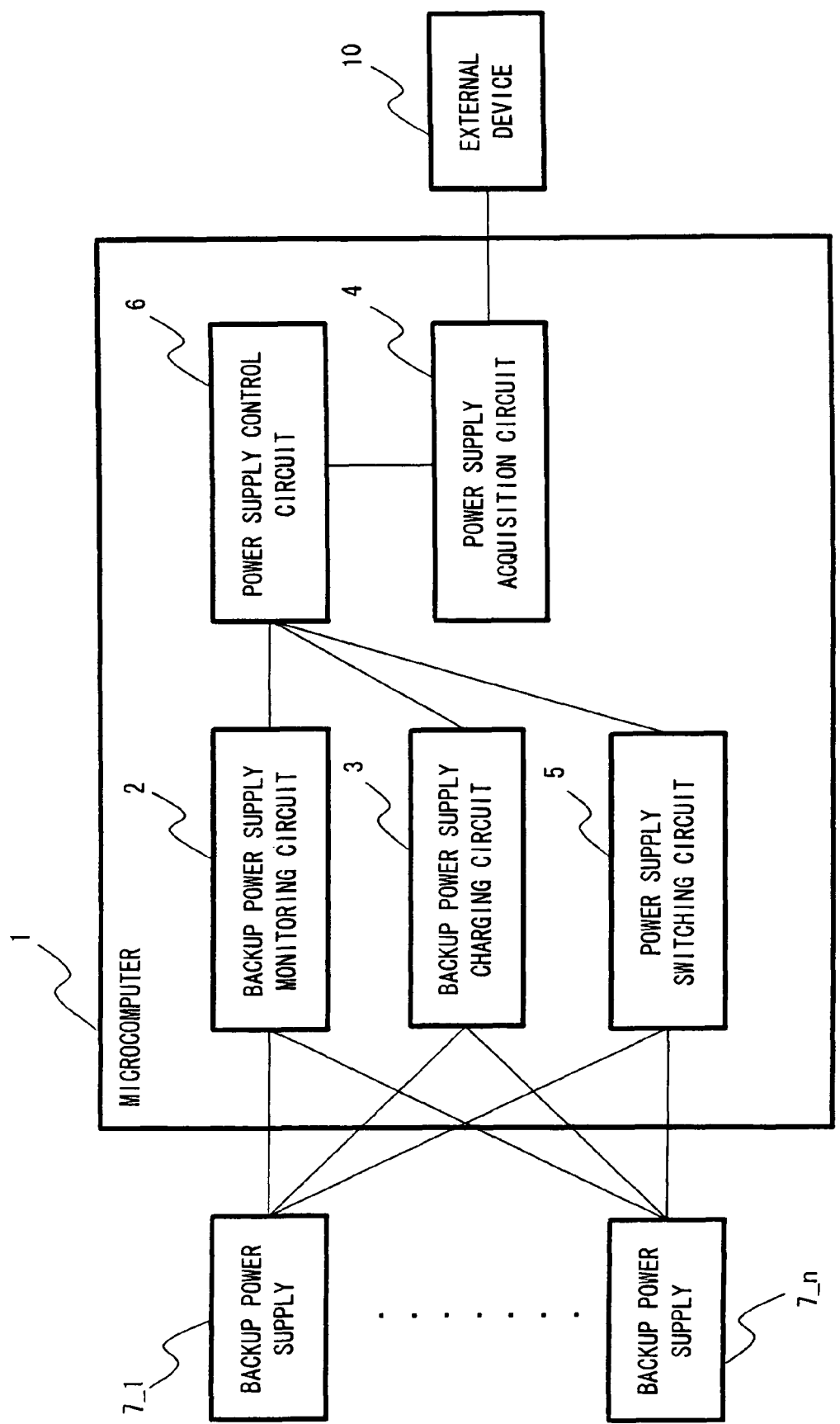
FIG. 1 is a block diagram of a microcomputer according to a first exemplary embodiment.

An exemplary embodiment of the invention is described with reference to the drawings. FIG. 1 illustrates the configuration of a microcomputer according to a first exemplary embodiment of the present invention.

A microcomputer 1 is provided with a backup power supply monitoring circuit 2, a backup power supply charging circuit 3, a power supply acquisition circuit 4, a power supply switching circuit 5, and a power supply control circuit 6. Further, backup power supplies 7_1 to 7_n are connected to the microcomputer 1. An external device 10 for supplying main power supply is connected to the microcomputer 1. Note that AC power supply or button cells can also supply power to the microcomputer, instead of the backup power supplies 7_1 to 7_n and the external device 10.

The backup power supply monitoring circuit 2 obtains charge amount from the backup power supplies 7_1 to 7_n. For example, the backup power supply monitoring circuit 2 is composed of an analog/digital converter. The backup power supply monitoring circuit 2 obtains each charge amount output from the backup power supplies 7_1 to 7_n as an analog signal. The backup power supply monitoring circuit 2 converts the obtained analog signal into a digital signal, and outputs the charge amount of each of the backup power supplies 7_1 to 7_n to the power supply control circuit 6.

The backup power supply charging circuit 3 obtains the charge amount of the backup power supplies 7_1 to 7_n from the power supply control circuit 6. The backup power supply charging circuit 3 checks the obtained charge amount, and charges using the power supply supplied from the main power supply to the backup power supplies 7 which run out of charge amount. Or the power supply control circuit 6 may specify the backup power supply 7 to charge. As to whether or not the charge amount is insufficient, the threshold of the charge amount required for each of the backup power supplies 7_1 to 7_n may be specified, so that if the charge amount has not reached the threshold, the charge amount may be determined to be insufficient. Moreover, if the charge amount has not reached the maximum charge capacity of each of the backup power supplies 7_1 to 7_n, the charge amount may be determined to be insufficient.

The backup power supplies 7_1 to 7_n are devices capable of charging. For example, the backup power supplies 7_1 to 7_n are composed of rechargeable batteries, such as secondary batteries or a supercapacitor.

Figure 2:
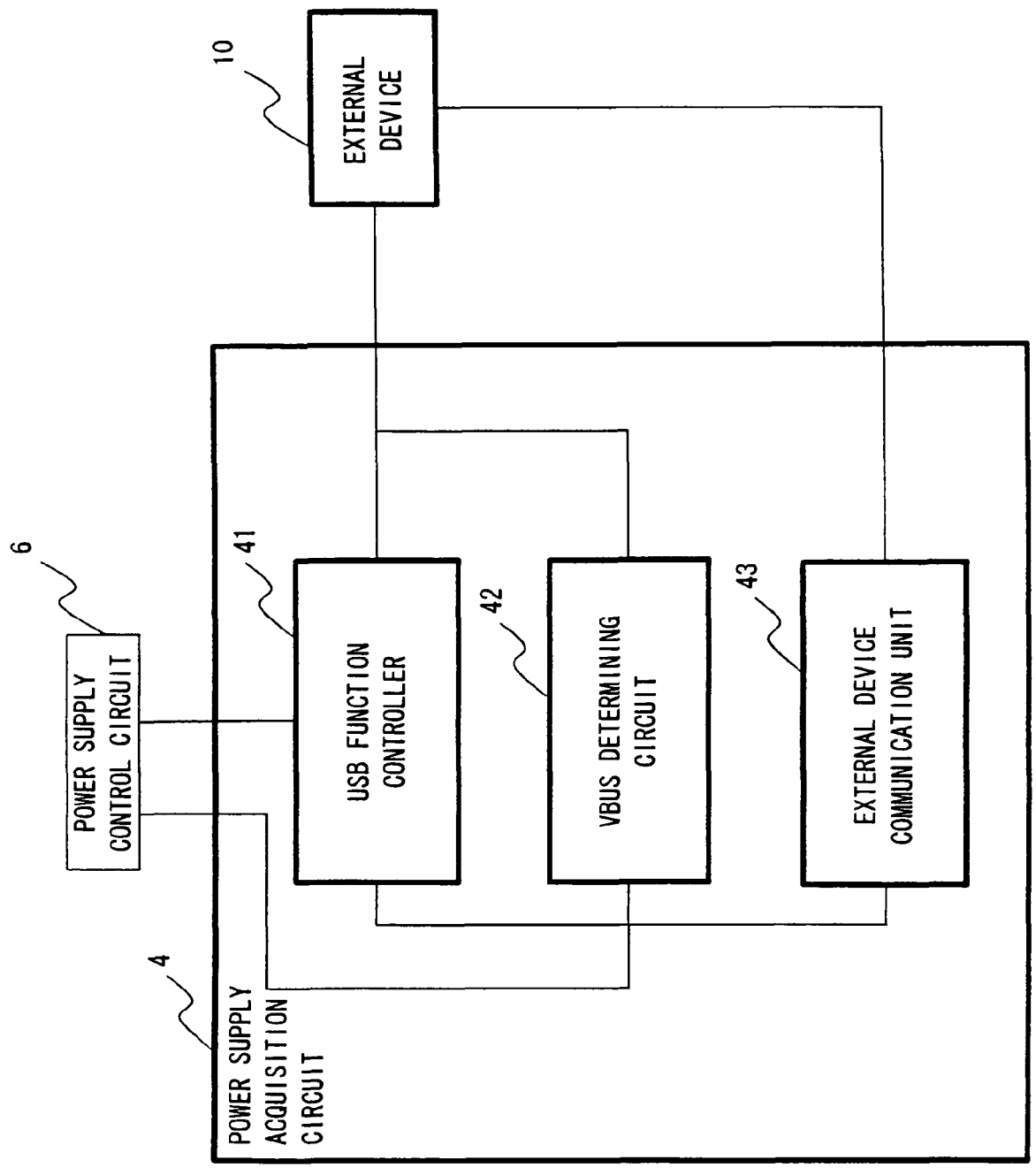
FIG. 2 is a block diagram of a power supply acquisition circuit according to the first exemplary embodiment.

The external device 10 for supplying the main power supply is connected to the power supply acquisition circuit 4, and supplies power to the power supply acquisition circuit 4. Specifically, the USB host device connected to the power supply acquisition circuit 4 via USB (Universal Serial Bus) supplies USB bus power supply (VBUS) to the power supply acquisition circuit 4. The USB bus power can receive power supply from the USB host device via a USB cable. As the USB host device, a PC (Personal Computer) corresponds, for example. The power supply acquisition circuit 4 also determines whether the external device 10 supplies power or not. The power obtained by the power supply acquisition circuit 4 and the determination result of whether or not the power is supplied is output to the power supply control circuit 6. The detailed configuration of the power supply acquisition circuit 4 is explained with reference to FIG. 2.

The power supply acquisition circuit 4 includes a USB function controller 41, a VBUS determining circuit 42, and an external device communication unit 43. The USB function controller 41 transmits and receives data to/from the external device 10, which is connected via a USB cable. The VBUS determining circuit 42 detects a non-supply state of VBUS supplied from the external device 10. The USB function controller 41 and the VBUS determining circuit 42 detect the non-supply state of VBUS, and output the detected result to the power supply control circuit 6. The external device communication unit 43 is connected to the external device 10 using a signal line different from USB connection. The USB function controller 41 notifies the non-supply state of VBUS to the external device communication unit 43. The external device communication unit 43 is used when required to access the external device 10 by communication other than USB communication.

There are following phenomena as the causes to stop the power supply from the external device 10. First cause is that the power supply is stopped because of a failure in the cable connecting between the external device 10 for supplying main power and the power supply acquisition circuit 4 or a failure in the external device 10, or a cable is pulled out of the microcomputer. The second phenomenon is that the power supply is stopped as the external device 10 for supplying main power enters a suspend state, thereby disconnecting VBUS. The first cause is found by detecting the non-supply state of VBUS by the VBUS determining circuit 42. The second cause is found by detecting the suspend state of the external device 10 by the USB function controller 41. Note that depending on the specification of the external device, VBUS may not be disconnected and the power may be supplied even if the external device is suspended.

Turning back to FIG. 1, in response to a notification from the power supply control circuit 6 that the main power supply from the external device 10 is off, the power supply switching circuit 5 switches to the backup power supply 7 selected from the backup power supplies 7_1 to 7_n. The backup power supply 7 with the highest charge amount may be selected from the backup power supplies 7_1 to 7_n. The information on the charge amount of the backup power supplies 7_1 to 7_n is obtained from the power supply control unit 6. Or the power supply switching circuit 5 may obtain the information specifying the backup power supply 7 with the highest charge amount from the power supply control circuit 6, selects the specified backup power supply 7, and then switches to it. Before the notification that the main power supply from the external device 10 is off, the power supply switching circuit 5 may select the backup power supply 7 with the highest charge amount from the backup power supplies 7_1 to 7_n. Then, the switch process to the backup power supply can be performed smoothly if notified that the power supply from the external device 10 is off.

The power supply control circuit 6 obtains the information on the charge amount of the backup power supplies 7_1 to 7_n from the backup power supply monitoring circuit 2. The power supply control circuit 6 outputs a charge control signal which directs the backup power supply charging circuit 3 to charge the necessary backup power supply 7 according to the obtained information on the charge amount of the backup power supplies 7_1 to 7_n. Or the power supply control circuit 6 outputs the information on the charge amount of the backup power supplies 7_1 to 7_n to the backup power supply charging circuit 3. In that case, the backup power supply charging circuit 3 charges using the power supply obtained from the power supply acquisition circuit 4.

Further, if the power supply acquisition circuit 4 notifies that the power supply from the external device 10 is off, the power supply control circuit 6 outputs a backup power supply selection signal for directing to switch to an appropriate backup power supply 7 to the power supply switching circuit 5.

Figure 3:
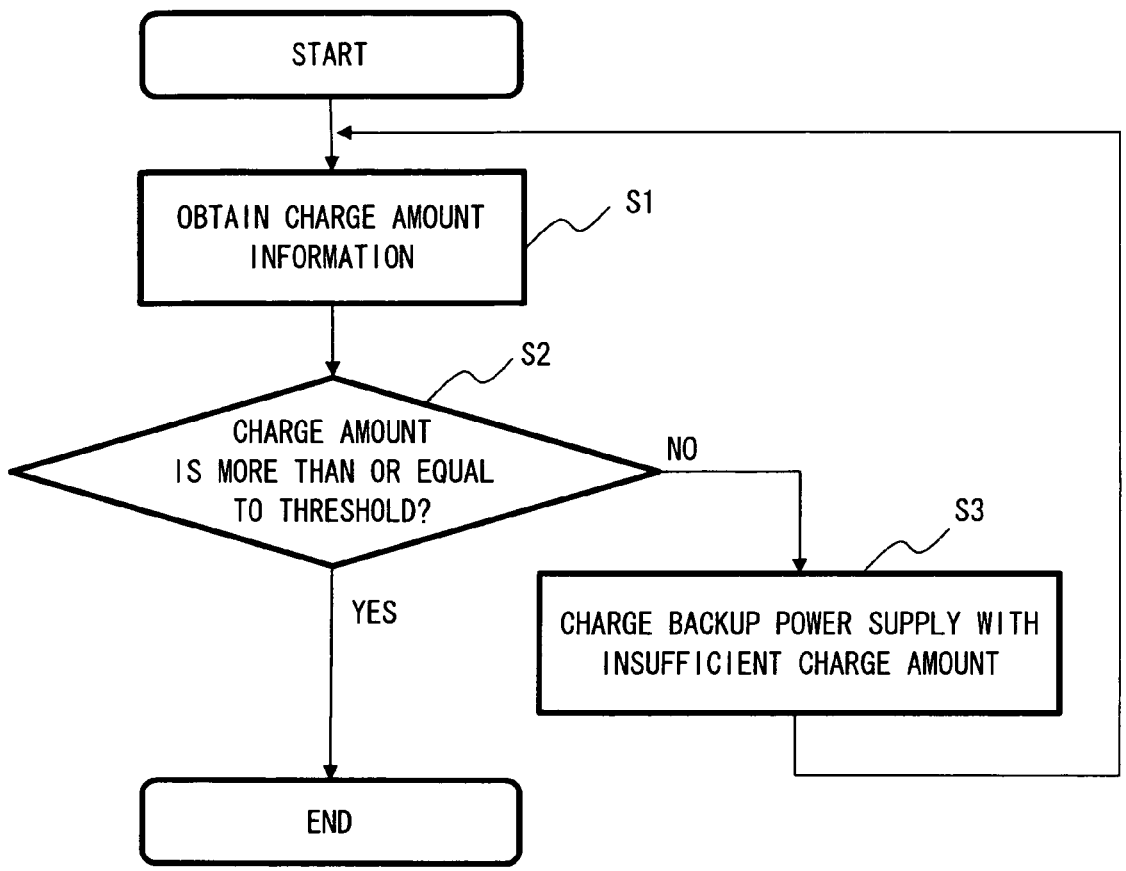
FIG. 3 is a flowchart of charge control according to the first exemplary embodiment.

Next, the process flow of the charge control according to the first exemplary embodiment of the present invention is described hereinafter with reference to FIG. 3. First, the backup power supply monitoring circuit 2 obtains the information on the charge amount from all the backup power supplies 7_1-7_n (S1). The obtained information on the charge amount is output to the power supply control circuit 6.

Next, the power supply control circuit 6 determines whether the charge amount of each of the backup power supplies 7_1 to 7_n is more than or equal to a predetermined threshold (S2). The power supply control circuit 6 may determine whether each of the backup power supplies 7_1 to 7_n satisfies the maximum charge capacity instead of determining whether the charge amount exceeds the predetermined threshold.

If the charge amount is more than or equal to the threshold or satisfies the maximum charge capacity for all the backup power supply 7, the power supply control circuit 6 completes the process of charge control.

If the charge amount of the backup power supply 7 is less than the threshold or does not satisfy the maximum charge amount, the power supply control circuit 6 outputs a charge control signal to the backup power supply charging circuit 3 in order to charge the backup power supply 7. The backup power supply charging circuit 3 performs the charge process to the backup power supply 7 which is notified by the charge control signal (S3). Or the backup power supply charging circuit 3, which obtained the threshold information and the charge amount of the backup power supply 7 by the charge control signal, may determine the backup power supply 7 which needs to be charged. After charging the backup power supply 7, the process returns to the step S1. Then if the charge amount of all the backup power supplies 7_1 to 7_n is detected to be more than or equal to the threshold, the process is completed.

Figure 4:
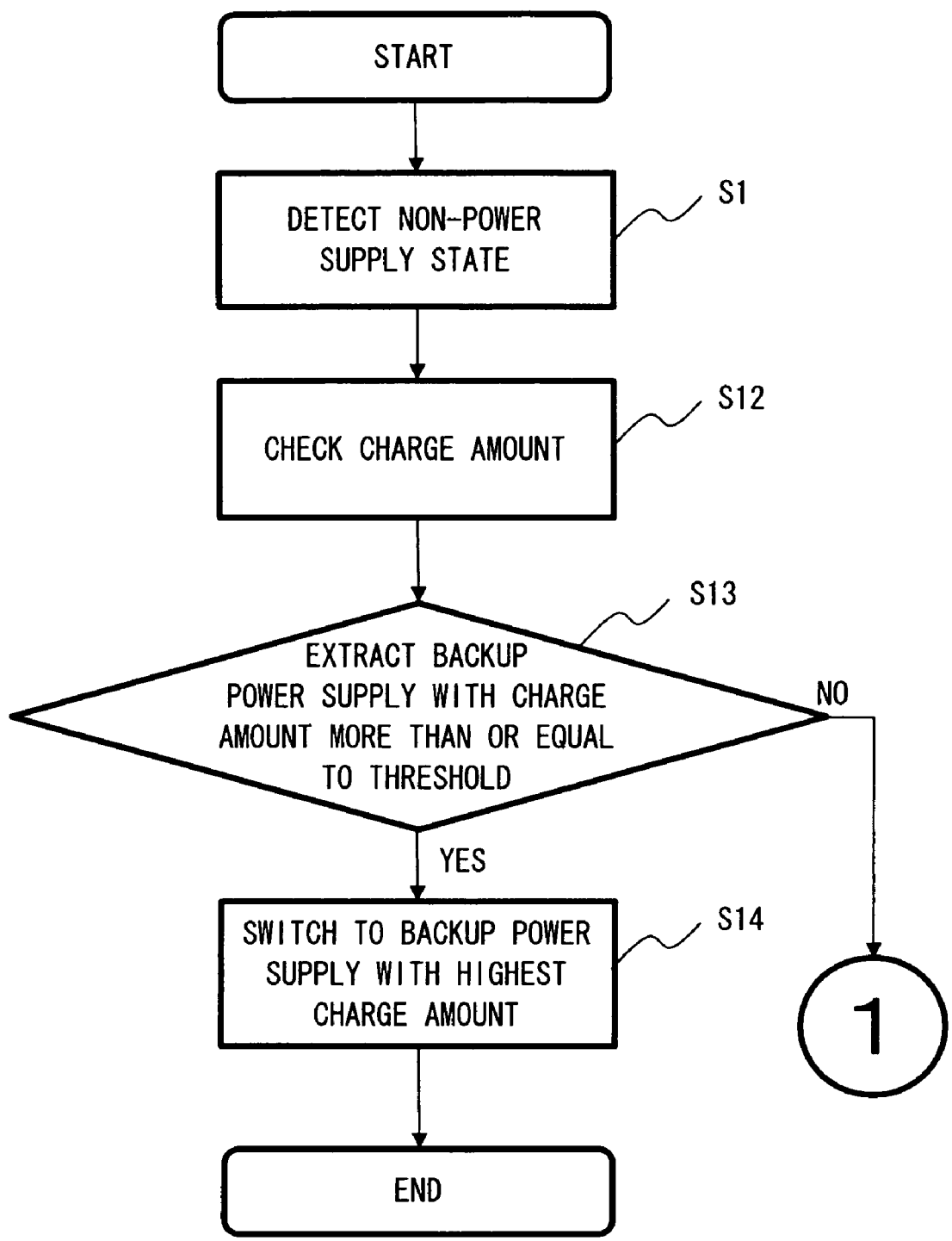
FIG. 4 is a flowchart of power supply switching control according to the first exemplary embodiment.

Next, the flow of the power supply switching process according to the first exemplary embodiment of the present invention is described with reference to FIG. 4. First, the power supply acquisition circuit 4 detects that the power supply from the external device 10 is stopped (S11). Specifically, the power supply acquisition circuit 4 monitors the power supply state from the external device 10 using the USB function controller 41 or the VBUS determining circuit 42, so as to detect that the power supply is stopped. The power supply acquisition circuit 4 outputs the detected result of the VBUS non-supply state to the power supply control circuit 6.

Next, the power supply control circuit 6 checks the charge amount of the backup power supplies 7_1 to 7_n obtained from the backup power supply monitoring circuit 2 (S12). The power supply control circuit 6 may check the charge amount obtained from the backup power supply monitoring circuit 2 after receiving the notification of the non-supply state of VBUS from the power supply acquisition circuit 4. Or as explained with reference to FIG. 3, the power supply control circuit 6 may check the charge amount obtained at the time of charge control of the backup power supplies 7_1 to 7_n.

Next, the power supply control circuit 6 extracts the backup power supply 7 from the backup power supplies 7_1 to 7_n that satisfies the charge amount more than or equal to the predetermined threshold (S13). The threshold can be specified as appropriate. The threshold may be specified to a voltage level required to continue the operation of the microcomputer for x seconds, for example.

Next, the power supply control circuit 6 outputs a power supply selection signal, which specifies the backup power supply 7 with the highest charge amount among the extracted backup power supplies 7, to the power supply switching circuit 5 (S14). If there are several backup power supplies 7 with the highest charge amount, the backup power supply 7 can be selected as appropriate, for example by selecting the lower numbered backup power supply 7.

As to the timing to switch from the main power supply supplied from the external device 10 to the backup power supply 7, the switch process to the backup power supply 7 may be carried out if the charge amount of all the backup power supplies 7_1 to 7_n satisfies the predetermined threshold or more, or if the charge amount of all the backup power supplies 7_1 to 7_n reaches the maximum charge capacity. By using the backup power supply 7 instead of the power supply from the external device 10, the power can be further saved.

Figure 5:
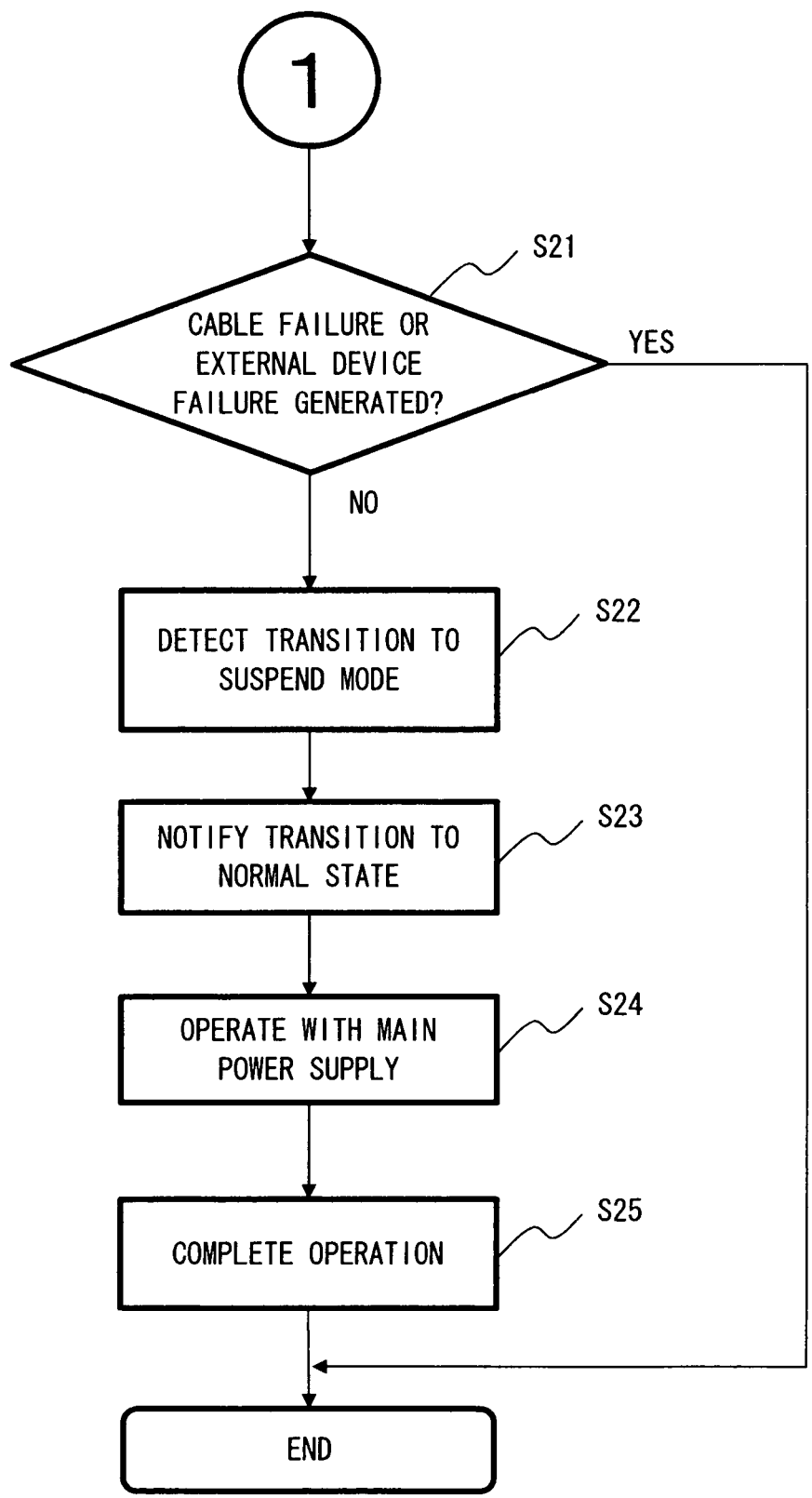
FIG. 5 is a flowchart of the power supply switch control according to the first exemplary embodiment.

Next, in the step S13, the process in case there is no extracted backup power supply 7 that satisfies the charge amount exceeding or equal to the threshold is described with reference to FIG. 5.

First, the power supply control circuit 6 determines whether the cause of the no-supply state of VBUS detected by the power supply acquisition circuit 4 is due to a failure in a cable or the external device 10 (S21). Specifically, if the power supply control circuit obtains the notification of the no-supply state of VBUS from the VBUS determining circuit 42, the power supply control circuit 6 determines that the cause is due to a failure in the cable or the external device 10. If the power supply control circuit 6 determines the cause of the non-supply state of VBUS is due to a failure in the cable or the external device 10, the process ends.

Next, the power supply control circuit 6 obtains the notification of the non-supply state of VBUS from the USB function controller 41. If the power supply control circuit 6 determines that the cause of the VBUS no-supply state is not due to a failure in the cable or the external device 10, the power supply control circuit 6 determines that the non-supply state of VBUS is generated because of the transition of the external device 10 to the suspend state (S22).

Next, the external device 10 for supplying the main power supply is notified to transition from the suspend state to the normal state (S23). Specifically, the external device communication unit 43 notifies the external device 10 using a signal line different from the USB connection to transition from the suspend state to the normal state. Then the microcomputer can notify the external device 10 for supplying the main power supply connected via USB to transition to the normal state. In response to the transition notification to the normal state, the external device 10 transitions from the suspend state to the normal state. At this time, the power supply control circuit 6 computes the operation time of the microcomputer. The power supply acquisition circuit 4 may notify the computed time to the external device 10 as the transition time from the suspend state to the normal state.

Next, the power supply acquisition circuit 4 operates the microcomputer with the power supplied from the external device 10 which supplies the main power supply (S24). After completing the microcomputer operation (S25), the external device 10 again transitions to the suspend state. If the operation time of the microcomputer is notified to the external device 10, the external device 10 transitions to the suspend state while the operation of the microcomputer is completed. If the operation time of the microcomputer is not notified to the external device 10, the completion of the microcomputer operation is notified to the external device 10, and then the external device 10 transitions to the suspend state. Or the external device 10 may automatically transition to the suspend state after predetermined time. At this time, in order to save the power, the microcomputer also transitions to the standby mode.

As explained above, the microcomputer according to the first exemplary embodiment of the present invention enables to use multiple backup power supplies 7. Moreover, by monitoring the state of the charge amount of the multiple backup power supplies 7, it is possible to switch to an appropriate backup power supply 7 to continue the operation even if the power supply from the main power supply is stopped.

Further, by connecting the microcomputer to the external device 10 for supplying the main power supply via USB, the microcomputer can continue the operation using the backup power supply 7 even if the external device 10 for supplying the main power supply transitions to the suspend state in order to save the power. At this time, if the charge amount of the microcomputer is insufficient, by the transition of the external device 10 for supplying the main power supply from the suspend state to the normal state, it is possible to continue the operation. Then if the microcomputer needs to operate, the microcomputer uses the backup power supplies 7, and can also be supplied with the main power supply, thereby enabling to continue the operation of the microcomputer while saving the power.

[Second Exemplary Embodiment]

Figure 6:
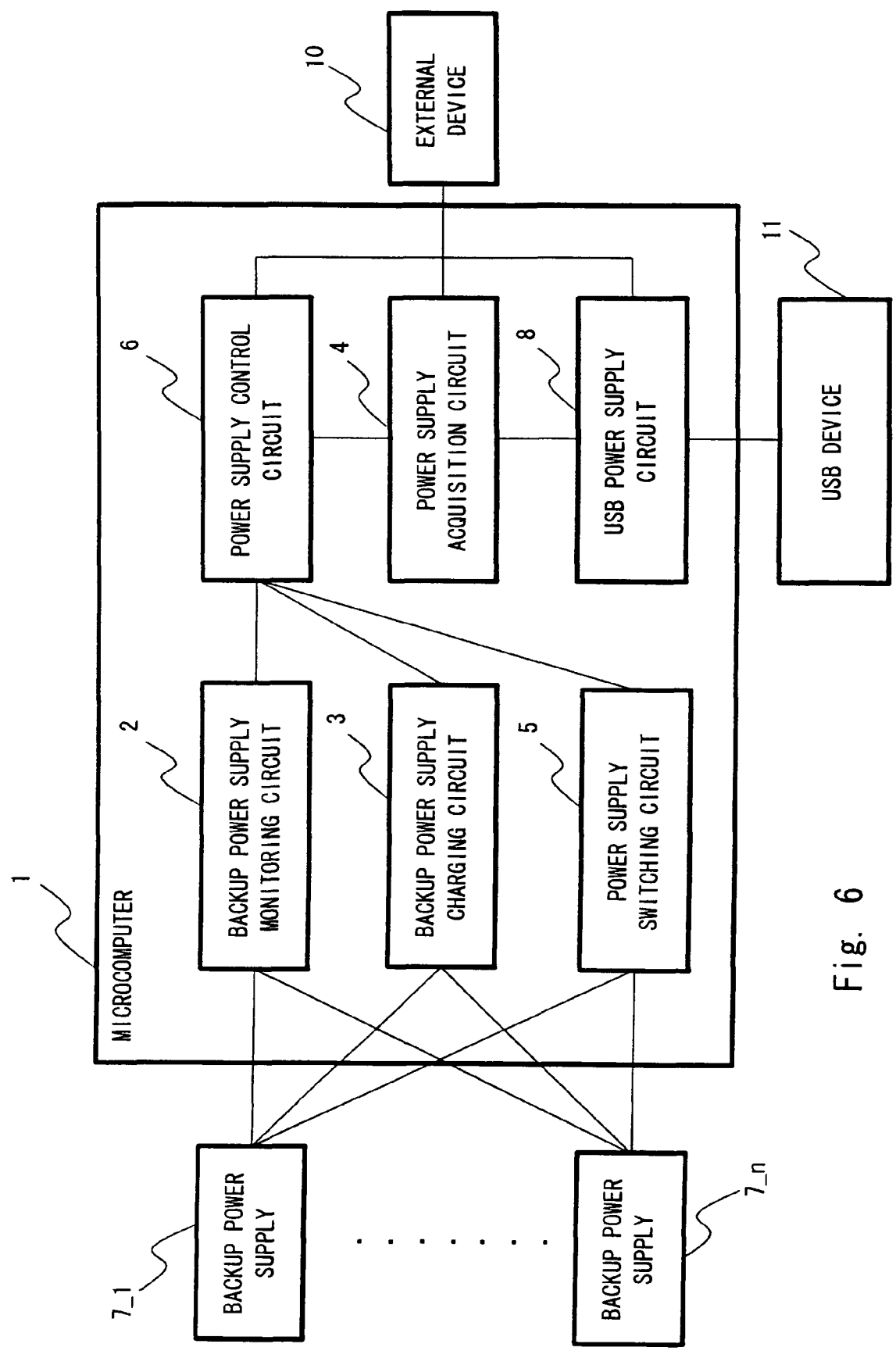
FIG. 6 is a block diagram of a microcomputer according to a second exemplary embodiment.

Next, a configuration example of a microcomputer according to a second exemplary embodiment of the present invention is described with reference to FIG. 6. The microcomputer according to the second exemplary embodiment of the present invention is provided with a USB power supply circuit 8. Other configuration is the same as FIG. 1, thus the explanation is omitted.

The USB power supply circuit 8 supplies the main power supply obtained by the power supply acquisition circuit 4 to a USB device 11, which is connected to the USB power supply circuit 8. Specifically, the USB power supply circuit 8 supplies USB bus power supply to the USB device 11, which is connected to the USB power supply circuit 8. The USB device 11 supplied with the USB bus power operates with the USB bus power supply as the main power supply.

Figure 7:
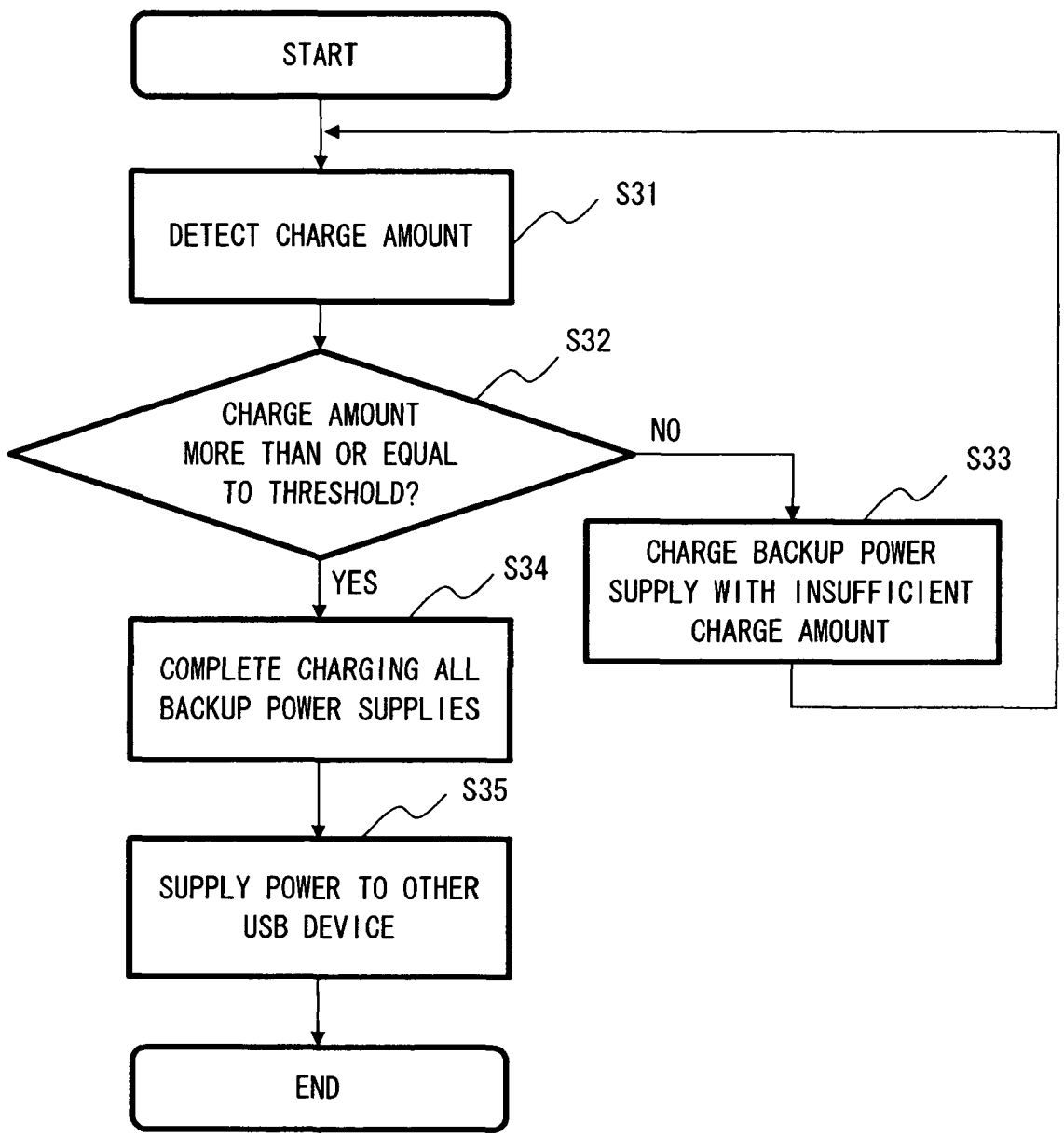
FIG. 7 is a flowchart of charge control according to the second exemplary embodiment.

Next, the process flow of the power supply to the external device 10 according to the second exemplary embodiment of the present invention is described with reference to FIG. 7. The processes up to the step S33 are same as FIG. 2, thus the explanation is omitted. The processes up to the step S33 are repeated and the charge to all the backup power supplies 7_1 to 7_n is completed (S34). Specifically, the charge amount of all the backup power supplies 7_1 to 7_n may be charged till reaching to the predetermined threshold, or till reaching to the maximum charge capacity of the backup power supplies 7_1 to 7_n.

Next, the power supply control circuit 6 directs the USB power supply circuit 8 to supply power to the USB device 11, which is connected to the USB power supply circuit 8. In response to the direction of power supply, the USB power supply circuit 8 starts supplying the power to the USB device 11 connected thereto (S35).

As described so far, by the microcomputer according to the second exemplary embodiment of the present invention, the power supply received from the external device 10 which supplies the main power supply can be used not only for charging the backup power supplies 7_1 to 7_n but for supplying the power to the USB device 11, thereby enabling to effectively use the supplied power.

[Third Exemplary Embodiment]

Figure 8:
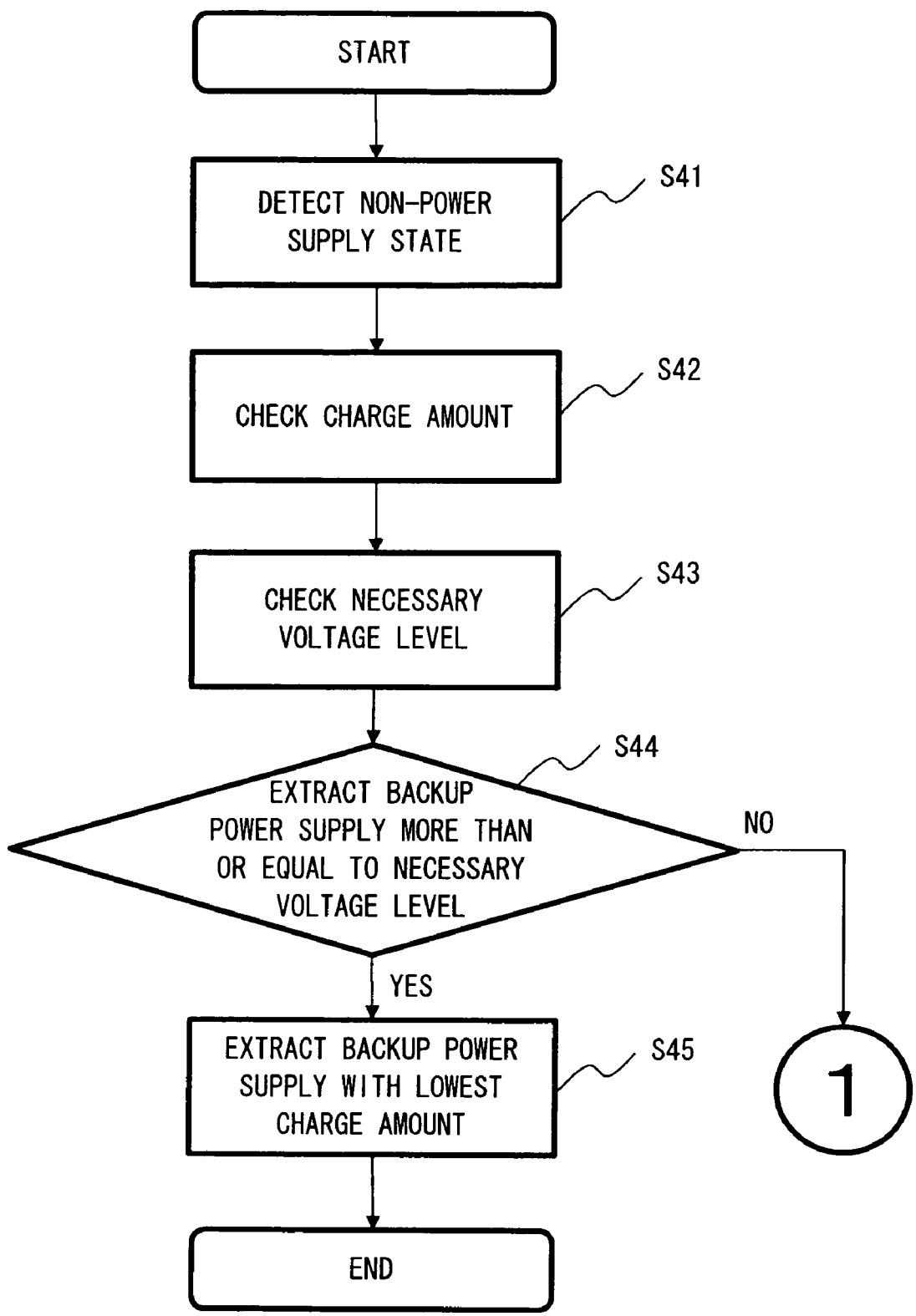
FIG. 8 is a flowchart of power supply switching control according to a third exemplary embodiment.

Next, the process flow of the power supply switch of a microcomputer according to a third exemplary embodiment of the present invention is described with reference to FIG. 8. The configuration of the microcomputer is the same as that of FIG. 1.

First, the power supply acquisition circuit 4 detects that the power supply from the external device 10 is off (S41). At this time, the cause that the power supply from the external device 10 is turned off may be either of the abovementioned first or the second cause.

Next, the power supply control circuit 6 obtains the state of the charge amount of the backup power supplies 7_1 to 7_n from the backup power supply monitoring circuit 2 (S42).

Next, the power supply control circuit 6 checks a necessary voltage level until the microcomputer currently operating completes the operation. The necessary voltage level may be notified to the power supply control circuit 6 from a CPU of the microcomputer. Or the power supply control circuit 6 may obtain time information required till the operation completion of the microcomputer, and compute the necessary voltage level based on the time information.

Next, the power supply control circuit 6 extracts the backup power supply 7 which has the charge amount more than or equal to the necessary voltage level till the operation completion of the microcomputer.

Next, the power supply control circuit 6 selects the backup power supply 7 with the lowest charge amount from the extracted backup power supplies 7. Then the power supply switch unit 5 switches to the selected backup power supply 7. Or if the sum of the charge amount of multiple backup power supplies 7 satisfies the necessary voltage level for the operation of the microcomputer, the multiple backup power supplies 7 may be switched sequentially to be selected.

As explained so far, by performing the power supply switching process according to the third exemplary embodiment of the present invention, the backup power supplies 7 at least required for the current operation can be selected from the backup power supplies 7_1 to 7_n and switched thereto. Then it is possible to keep the backup power supplies 7 with large charge amount, thereby enabling to effectively use the backup power supply according to the voltage level necessary for the operation.

The present invention may also be realized by the computer program to execute any process on a CPU (Central Processing Unit). The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

As an example, the procedure for directing the computer to execute the process content of the charge control of the control circuit 6, which is described in the first exemplary embodiment, is described with reference to FIG. 3. In the step S1, the computer obtains the information concerning the charge amount of the backup power supplies 7_1 to 7_n from the backup power supply monitoring circuit 2.

In the step S2, the computer determines whether the charge amount of the backup power supplies 7_1 to 7_n is more than or equal to the predetermined threshold. The computer may determine whether the charge amount satisfies the maximum charge amount of the backup power supplies 7_1 to 7_n instead of determining whether the charge amount exceeds the threshold. If the charge amount satisfies the threshold or the maximum charge amount, the process of charge control is completed.

In the step S3, if the charge amount of any of the backup power supplies 7_1 to 7_n is less than the threshold or does not satisfy the maximum charge amount, the computer outputs a charge control signal to the backup power supply charging circuit 3 for directing to charge the corresponding backup power supply 7. After charging the backup power supply 7 by the backup power supply charging circuit 3, the process returns to the step S1. Then, if the computer detects that the charge amount of all the backup power supplies 7_1 to 7_n is more than or equal to the threshold, the process is completed.

As another example, the procedure for directing a computer to execute the process content of the power supply switch, which is described in the first exemplary embodiment, is described with reference to FIG. 4. In the step S11, the computer detects that the power supply from the external device 10 is off by a notification from the power supply acquisition circuit 4.

In the step S12, the computer obtains the charge amount of the backup power supplies 7_1 to 7_n from the backup power supply monitoring circuit 2.

In the step S13, the computer extracts the backup power supply 7 with the charge amount satisfying the predetermined threshold charge amount from the backup power supplies 7_1 to 7_n.

In the step S14, the computer outputs a power supply selection signal which specifies the backup power supply 7 with the highest charge amount from the extracted backup power supplies 7 to the power supply switching circuit 5.

The present invention is not limited to the above exemplary embodiment, but may be modified within the scope and the sprit of the present invention.

The first, second and third exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A microcomputer system comprising:
   a plurality of backup power supplies that are used instead of a main power supply in response to a voltage drop of the main power supply;
   a backup power supply monitoring unit that monitors charge amount of the plurality of backup power supplies and determines whether the charge amount is lower than a predetermined charge amount;
   a backup power supply charging unit that charges the backup power supply from the main power supply, the backup power supply being determined that the charge amount thereof is lower than the predetermined charge amount by the backup power supply monitoring unit; and
   a power supply switching unit that switches to the backup power supply selected according to a predetermined rule if a voltage of the main power supply reduces.

2. The microcomputer system according to claim 1, wherein the power supply switching unit switches to the backup power supply with a highest charge amount if a voltage of the main power supply reduces.

3. The microcomputer system according to claim 1, wherein the power supply switching unit selects the backup power supply to switch according to a necessary voltage level for an operation of the microcomputer if the voltage of the main power supply reduces.

4. The microcomputer system according to claims 1, wherein the backup power supply charging unit charges from a USB device.

5. The microcomputer system according to claim 4, wherein
   the power supply switching unit switches to the backup power supply if the power supply switching unit detects a voltage drop of the main power supply, the voltage drop being caused by the USB device to be in a suspend state, and
   after completing the operation of the microcomputer which has used the backup power supply switched by the power supply switching unit, the microcomputer shifts to a suspend state.

6. The microcomputer system according to claim 4, further comprising a communication unit that transmits a signal to release the suspend state of the USB device if the USB device enters a suspend state thereby causing the voltage drop of the main power supply and the charge amount of the plurality of backup supplies is lower than the predetermined charge amount.

7. The microcomputer system according to claims 4, wherein the backup power supply charge control unit supplies the power supplied from the main power supply to the USB device, the USB device being connected to the microcomputer.

8. A microcomputer comprising:
   a backup power supply monitoring unit that monitors charge amount of a plurality of backup power supplies and also determines whether the charge amount is lower than a predetermined charge amount, the plurality of backup power supplies being used instead of a main power supply in response to a voltage drop of the main power supply;
   a backup power supply charge control unit that charges the backup power supply from the main power supply, the backup power supply being determined by the backup power supply monitoring unit that the charge amount thereof is lower than the predetermined charge amount; and a power supply switching unit that switches to the backup power supply, the backup power supply being selected previously according to a predetermined rule if a voltage of the main power supply reduces.

9. A method of power supply control comprising:

monitoring a charge amount of a plurality of backup power supplies, the plurality of backup power supplies being used instead of the main power supply in response to a voltage drop of a main power supply;

determining whether the charge amount is lower than a predetermined charge amount;

charging the backup power supply from the main power supply, the backup power supply being determined that the charge amount thereof is lower than the predetermined charge amount; and switching to the backup power supply selected according to a predetermined rule if a voltage of the main power supply reduces.

10. A non-transitory computer readable medium that stores a power supply control program for causing a control computer of a microcomputer to execute:

monitoring charge amount of a plurality of backup power supplies, the plurality of backup power supplies being used instead of the main power supply in response to a voltage drop of a main power supply;

determining whether the charge amount is lower than a predetermined charge amount;

directing to charge the backup power supply from the main power supply, the charge amount of the backup power supply being lower than the predetermined charge amount; and switching to the backup power supply selected according to a predetermined rule if a voltage of the main power supply reduces.

* * * * *